US011012349B2

(12) United States Patent
Semwal et al.

(10) Patent No.: US 11,012,349 B2
(45) Date of Patent: May 18, 2021

(54) ROUTE REFLECTOR OPTIMIZATIONS FOR INTERCONNECTING MPLS-BASED L3-VPN AND L3-EVPN NETWORKS

(71) Applicant: Arista Networks, Inc., Santa Clara, CA (US)

(72) Inventors: Rajesh Kumar Semwal, Sunnyvale, CA (US); Amit Dattatray Ranpise, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 82 days.

(21) Appl. No.: 16/457,630

(22) Filed: Jun. 28, 2019

(65) Prior Publication Data
US 2020/0412645 A1 Dec. 31, 2020

(51) Int. Cl.
*H04L 12/28* (2006.01)
*H04L 12/723* (2013.01)
(Continued)

(52) U.S. Cl.
CPC .......... *H04L 45/50* (2013.01); *H04L 12/4641* (2013.01); *H04L 12/66* (2013.01); *H04L 45/74* (2013.01); *H04L 69/325* (2013.01)

(58) Field of Classification Search
CPC ....... H04L 45/74; H04L 69/22; H04L 45/745; H04L 45/7453; H04L 45/38
See application file for complete search history.

(56) References Cited

U.S. PATENT DOCUMENTS

| 9,124,511 | B2 * | 9/2015 | Olofsson ................. H04L 45/04 |
| 2007/0104106 | A1 * | 5/2007 | Patel ........................ H04L 45/04 |
| | | | 370/238 |

(Continued)

FOREIGN PATENT DOCUMENTS

CN 100387019 C * 10/2006

OTHER PUBLICATIONS

Rabadan et al., "EVPN Interworking with IPVPN draft-rabadan-sajassi-bess-evpn-ipvpn-interworking-02," BESS Workgroup, Internet Draft, Intended status: Standards Track, Jan. 7, 2019, 23 pages.

(Continued)

*Primary Examiner* — Atique Ahmed
(74) *Attorney, Agent, or Firm* — Haley Guiliano LLP (57) ABSTRACT

Methods and systems are described for providing route advertisements to provider edge devices on virtual private networks implemented using different protocols. An illustrative method includes receiving, from a first provider edge device on a first virtual private network (VPN), a route advertisement in a first format, wherein the first format corresponds to a first standard, determining whether the first format is translatable to a second format, wherein the second format corresponds to a second standard, in response to determining that the first format is translatable to the second format, identifying parameters for translating a route included in the route advertisement from the first format into the second format, generating a translated route advertisement by translating the route included in the route advertisement in accordance with the identified parameters, and transmitting, to a second provider edge device on a second VPN, the translated route advertisement including the translated route.

17 Claims, 5 Drawing Sheets

(51) Int. Cl.
*H04L 12/741* (2013.01)
*H04L 29/08* (2006.01)
*H04L 12/66* (2006.01)
*H04L 12/46* (2006.01)

(56) References Cited

U.S. PATENT DOCUMENTS

| | | | | |
|---|---|---|---|---|
| 2007/0260746 | A1* | 11/2007 | Mirtorabi | H04L 45/02 709/238 |
| 2010/0177674 | A1* | 7/2010 | Aggarwal | H04L 45/50 370/312 |
| 2012/0224506 | A1* | 9/2012 | Gredler | H04L 45/121 370/254 |
| 2015/0063363 | A1* | 3/2015 | van Bemmel | H04L 69/167 370/401 |
| 2016/0285760 | A1* | 9/2016 | Dong | H04L 45/586 |
| 2018/0351857 | A1* | 12/2018 | Vairavakkalai | H04L 63/0272 |
| 2019/0132280 | A1* | 5/2019 | Meuninck | H04L 12/66 |

OTHER PUBLICATIONS

Rabadan et al., IP Prefix Advertisement in EVPN draft-ietf-bess-evpn-prefix-advertisement-04, BESS Workgroup, Internet Draft, Intended status: Standards Track, Feb. 13, 2017, 30 pages.

Rosen et al., "BGP/MPLS IP Virtual Private Networks (VPNs)," Network Working Group, Request for Comments: 4364, Obsoletes: 2547, Category: Standards Track, Feb. 2006, 47 pages.

Sajassi et al., "BGP MPLS-Based Ethernet VPN," Internet Engineering Task Force (IETF), Request for Comments: 7432, Category: Standards Track, ISSN: 2070-1721, Feb. 2015, 56 pages.

Sajassi et al., "Requirements for Ethernet VPN (EVPN)," Internet Engineering Task Force (IETF), Request for Comments: 7209, Category: Informational, ISSN: 2070-1721, May 2014, 15 pages.

* cited by examiner

ROUTE REFLECTOR OPTIMIZATIONS FOR INTERCONNECTING MPLS-BASED L3-VPN AND L3-EVPN NETWORKS

BACKGROUND

The present disclosure relates to interconnecting virtual private networks (VPNs), and more particularly, to methods and systems for configuring a route reflector to interconnect a multiprotocol label switching (MPLS)-based layer 3 (L3) virtual private network and an ethernet virtual private network (EVPN).

SUMMARY

A VPN is a network configuration that extends a private network (e.g., an organization's internal network) over a public network (e.g., the Internet), typically to connect remote devices to the private network or to connect private networks at disparate locations. VPNs have become a central, and even essential, part of organizations' network design, particularly when connecting internal networks at different sites. VPNs are often configured to operate both a control plane (used to receive and distribute routes between routers on the network) and a data plane (used to transfer the data packets along the routes determined by the control plane). VPNs may be operated using different protocols on both the control plane and the data plane. Examples of protocols VPNs may operate on the control plane include internet protocol (IP) version four (IPv4), IP version six (IPv6), and EVPN, among others. VPNs may be configured to operate on layer 2 (L2) (e.g., the "data link layer" which transfers data between adjacent network nodes in a wide area network (WAN) or local area network (LAN) segment) and/or layer 3 (L3) (e.g., the "network layer" which forwards and routes packets through intermediate routers) of the open systems interconnection (OSI) model of computer networking.

As with most computer systems, technological advancement often results in legacy components no longer being interoperable with new components. This is particularly applicable with computer networks where components operating on legacy protocols may not be able to communicate with components operating on new protocols. Thus, in order to maintain operation of a network with legacy components, any components added to the network must operate on the same protocol, which requires either adding additional legacy components to the network (if such components are still available) or replacing all the legacy components with new components (which may be undesirable for cost and/or logistical reasons) and thus switch the entire network over to the new protocols.

The development of MPLS has enabled routing of data between nodes in a network based on labels identifying paths between distant nodes, rather than network address-based routing which identifies endpoints, thereby enabling routing of data between networks operating on different data plane protocols. But, for a MPLS router to be able to determine which label to affix to a packet, the router must be able to determine the path to the endpoint, which happens on the control plane. While the aforementioned VPN protocols (i.e., IPv4 VPN, IPv6 VPN, and EVPN) are all compatible with MPLS on the data plane, the standard according to which network addresses are described in route advertisements on the control plane differs between these VPN protocols. Thus, even though VPNs operating on the different protocols can route traffic to each other on the data plane, they are not able to communicate on the control plane, and thus cannot exchange routes among each other.

Some embodiments seek to address these problems by simultaneously maintaining routing tables corresponding to the standards according to which network addresses are described for each of the VPN protocols of the VPNs being interconnected. This, however, results in significant additional network traffic, processing power, and memory usage on the border gateway protocol (BGP) speakers in order to receive, store, and distribute route advertisements in multiple standards and/or formats.

In order to overcome these problems, methods and systems are described herein for interconnecting VPNs operating on different VPN protocols by translating the routes into formats used by the different VPN protocols. In particular, the embodiments described herein provide for receiving, from a first provider edge device on a first VPN implemented using a first protocol, a route advertisement in a first address family format, wherein the first address family format corresponds to a first address family standard. The embodiments further provide for determining whether the first address family format is translatable to a second address family format, wherein the second address family format corresponds to a second address family standard. Additionally, the embodiments provide for, in response to determining that the first address family format is translatable to the second address family format, identifying parameters for translating a route included in the route advertisement from the first address family format into the second address family format, generating a translated route advertisement by translating the route included in the route advertisement in accordance with the identified parameters, and transmitting, to a second provider edge device on a second VPN implemented using a second protocol, a translated route advertisement including the translated route.

Further embodiments described herein provide for identifying a route type in the route advertisement and determining the second address family format based on the route type. The embodiments also provide for determining the second protocol based on the route type and determining the second address family format based on the second protocol. Additional embodiments described herein provide for determining whether the route advertisement includes byte fields corresponding to the second address family standard. The embodiments further provide for extracting, from the route advertisement, a first predetermined byte field including a network path attribute, and generating a translated route advertisement message by inserting the extracted network path attribute in a second predetermined byte field of the translated route advertisement message, as well as extracting, from the route advertisement, network layer reachability information (NLRI), wherein generating the translated route advertisement message further comprises inserting the extracted NLRI in a third predetermined byte field of the translated route advertisement message. Further embodiments provide for extracting, from the route advertisement, an internet protocol (IP) prefix and a multiprotocol label switching (MPLS) label.

The methods and systems described herein thus reduce the amount of network traffic (or network load) needed to generate and maintain the routing tables for interconnecting VPNs operating on different VPN protocols, thus improving the efficiency of the connection between the VPNs and making more bandwidth available for data traffic. The methods and systems further improve the efficiency and reduce the load on the BGP speakers by reducing the amount of processing power and memory needed to generate and maintain the routing table since only a single routing table is involved, and the routes are translated into the standard used by the VPN protocol of the VPN to which the route advertisement is provided. Additionally, since the described embodiments are implemented on the route reflectors, which already form part of the existing networks, no additional hardware is required to implement the embodiments.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
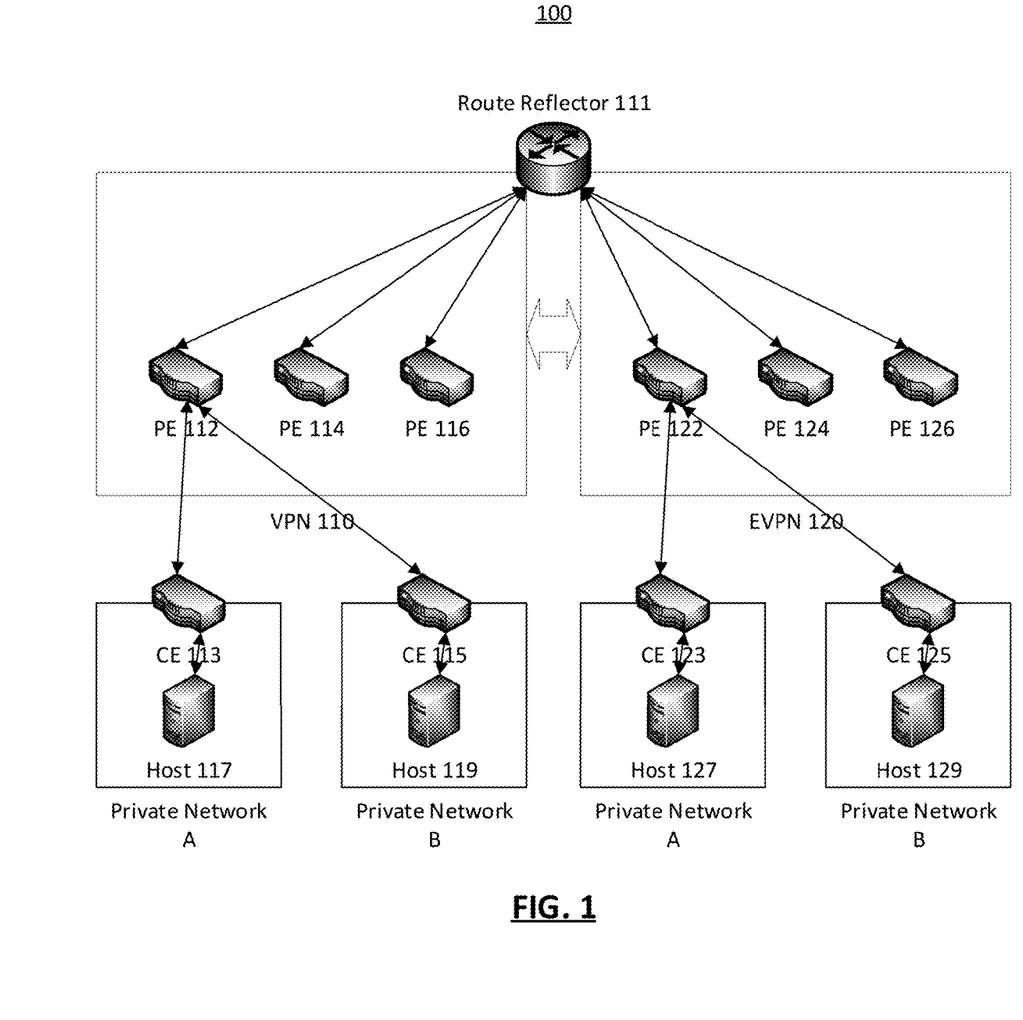
FIG. 1 shows an illustrative network topology of a system for providing route advertisements to provider edge devices on VPNs implemented using different protocols, in accordance with some embodiments of the disclosure.

FIG. 1 shows an illustrative network topology of a system 100 for providing route advertisements to provider edge devices on VPNs implemented using different protocols. In particular, FIG. 1 shows two VPNs, each implemented using a different VPN protocol. In the example shown in FIG. 1, a VPN 110 is implemented using a L3VPN protocol, and an EVPN 120 is implemented using the EVPN protocol. Each of VPN 110 and EVPN 120 uses a routing protocol (such as BGP, GOOGLE ESPRESSO, etc.) to exchange routing and reachability information among the various devices within VPN 110 and EVPN 120, VPN 110 includes a route reflector (or route server) 111 and a plurality of provider edge (PE) devices 112, 114, and 116. Each of PE devices 112, 114, and 116 are connected to at least one private network via a customer edge (CE) device, but only the private networks A and B connected to PE device 112 is shown in FIG. 1 to avoid overcomplicating the drawing. PE device 112 is thus connected to private network A via CE device 113 and to private network B via CE device 115. Each of private networks A and B may have a plurality of connected hosts and/or other devices, but only a single host 117 is shown in private network A and a single host 119 is shown in private network B to avoid overcomplicating the drawing.

Likewise, EVPN 120 includes route reflector 111 and a plurality of PE devices 122, 124, and 126. Each of PE devices 122, 124, and 126 are connected to at least one private network via a CE device, but only the private networks A and B connected to PE device 122 is shown in FIG. 1 to avoid overcomplicating the drawing. PE device 122 is thus connected to private network A via CE device 123 and to private network B via CE device 125. Each of private networks A and B may have a plurality of connected hosts and/or other devices, but only a single host 127 is shown in private network A and a single host 129 is shown in private network B to avoid overcomplicating the drawing.

Thus, in the example shown in FIG. 1, private networks A and B are split between VPN 110 and EVPN 120 (i.e., portions of private networks A and B are connected to both VPN 110 and EVPN 120). In some embodiments, VPN 110 is a MPLS-based L3VPN in which the network nodes (e.g., PE devices 112, 114, and 116, as well as other devices not shown in FIG. 1) maintain a L3VPN BGP session with route reflector 111. Likewise, in some embodiments, EVPN 120 is a MPLS-based EVPN in which the network nodes (e.g., PE devices 122, 124, and 126, as well as other devices not shown in FIG. 1) maintain an EVPN BGP session, and exchange EVPN type-5 routes, with route reflector 111.

VPN 110 and EVPN 120 have data-plane connectivity provided by MPLS tunnels between PE devices 112, 114, and 116 of VPN 110 and PE devices 122, 124, and 126 of EVPN 120. Thus, CE device 113 is connected to CE device 123 via the MPLS tunnels, for example, an MPLS tunnel between PE device 112 and PE device 122. Likewise, CE device 115 is connected to CE device 125 via the MPLS tunnels, for example, an MPLS tunnel between PE device 112 and PE device 122.

Due to the connection between CE devices 113 and 123, a single IP routing table, such as an IP virtual routing and forwarding (VRF) table, for private network A can span both VPN 110 and EVPN 120. Likewise, an IP routing table for private network B can span both VPN 110 and EVPN 120. Additionally, VPN 110 and EVPN 120 may have identical VPN configurations for private networks A and B on BGP speakers (not expressly shown in FIG. 1) associated with VPN 110 and EVPN 120, respectively.

While FIG. 1 shows VPN 110 and EVPN 120 having a shared route reflector (i.e., route reflector 111), those skilled in the art will appreciate that each of VPN 110 and EVPN 120 may have its own route reflector, and that these route reflectors may maintain both an EVPN and a L3VPN session between them. In other embodiments, additional route reflectors may be included in and/or interspersed between the VPN 110 and the EVPN 120 without departing from the scope of the present disclosure. For example, each of VPN 110 and EVPN 120 may have its own route reflector, and there may be one or more additional route reflectors in the path between the route reflector of VPN 110 and the route reflector of EVPN 120. Further, in the embodiments where route reflector 111 is shared between VPN 110 and EVPN 120, as well as the embodiments where VPN 110 and EVPN 120 each have its own route reflector, one or more additional route reflectors may be configured as redundant route reflectors (e.g., as a backup to, and/or to share the load with, route reflector 111 or the dedicated route reflectors for VPN 110 and EVPN 120) and may also be shared between VPN 110 and EVPN 120, or be dedicated to VPN 110 or EVPN 120, depending on the respective network configurations. In some embodiments, route reflector 111 may also be configured to act as a BGP speaker for VPN 110 and/or EVPN 120. Additionally or alternatively, a device other than route reflector 111 may be configured to act as a BGP speaker for VPN 110 and/or EVPN 120. For example, some or all of PE devices 112, 114, 116 may be configured to act as BGP speakers for VPN 110 and some or all of PE devices 122, 124, 126 may be configured to act as BGP speakers for EVPN 120.

In the embodiment shown in FIG. 1, PE device 112 is connected to route reflector 111 using the L3VPN session of VPN 110, and PE device 122 is connected to route reflector 111 using the EVPN session of EVPN 120. Both PE device 112 and PE device 122 exchange VPN routes with route reflector 111. Route reflector 111 generates and maintains a route eligibility table of BGP speakers that are eligible to receive routes advertised by a particular PE device.

As further described below, when route reflector 111 receives a route advertisement including a L3VPN route from PE device 112, route reflector 111 consults its route eligibility table to determine which BGP speakers are eligible to receive the route, determines whether the route needs to be translated for any of the eligible BGP speakers and/or PE devices to accept the route, translates the route (if needed), and transmits a route advertisement including the route (or translated route, if needed) to those BGP speakers or PE devices. For example, route reflector 111 may translate the L3VPN route to a type 5 EVPN route and transmit a route advertisement including the type 5 EVPN route to PE device 122. Likewise, when route reflector 111 receives a route advertisement including a type 5 EVPN route from PE device 122, route reflector 111 consults its route eligibility table to determine which BGP speakers are eligible to receive the route, determines whether the route needs to be translated for any of the eligible BGP speakers and/or PE devices to accept the route, translates the route (if needed), and transmits a route advertisement including the route (or translated route, if needed) to those BGP speakers or PE devices. For example, route reflector 111 may translate the type 5 EVPN route into a L3VPN route and transmit a route advertisement including the L3VPN route to PE device 112. The procedure for translating the routes are more fully described below with reference to FIG. 5.

Figure 2:
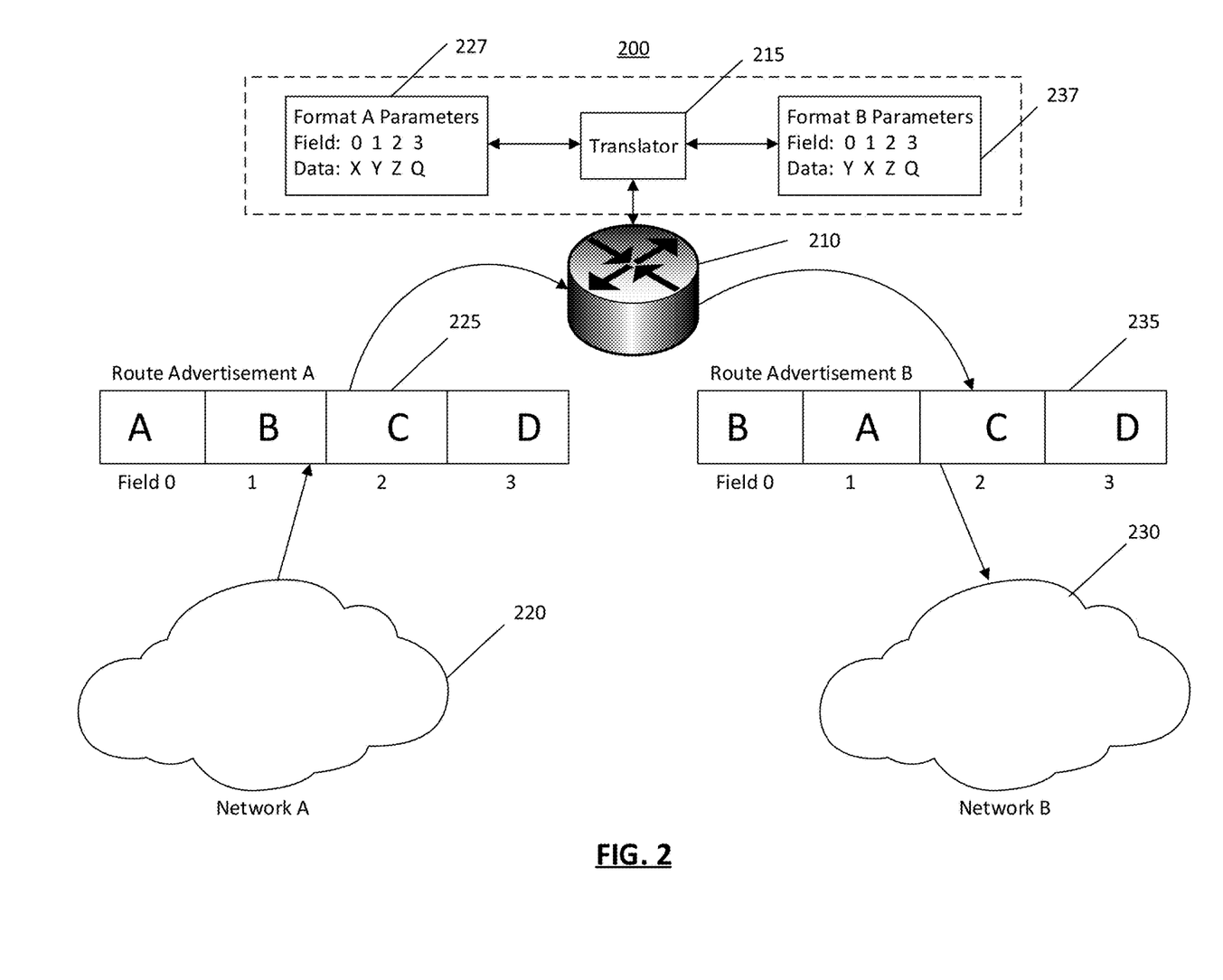
FIG. 2 shows an illustrative diagram of a procedure for providing route advertisements to provider edge devices on VPNs implemented using different protocols, in accordance with some embodiments of the disclosure.

FIG. 2 shows an illustrative diagram of a procedure for providing route advertisements to PE devices on VPNs implemented using different protocols. In particular, FIG. 2 shows a route reflector 210 connected to a network 220 (network A) and a network 230 (network B). Network 220 may be a L3VPN network, and network 230 may be an EVPN network. Route reflector 210 receives a route advertisement 225 (route advertisement A) from a node on network 220 (e.g., from a PE device such as PE 112), translates route advertisement 225 into a translated route advertisement 235 (route advertisement B), and provides route advertisement 235 to a node on network 230 (e.g., to a PE device such as PE 122). Route advertisement 225 includes a plurality of byte fields, shown in FIG. 2 as byte fields 0, 1, 2, and 3, and each byte field includes a data entry, shown in FIG. 2 as data entries A, B, C, and D.

Upon receiving route advertisement 225, route reflector 210 translates the route using a translator 215 (such as control circuitry or processing circuitry described below with reference to FIG. 3). Route reflector 210 may retrieve parameters indicating a type of data included in each byte field of route advertisements generated according to a particular format (such as an address family format). For example, route reflector 210 may retrieve a parameter table 227 for format A, which indicates that types X, Y, Z, and Q data correspond to fields 0, 1, 2, and 3, respectively, of a route advertisement generated according to format A. Likewise, route reflector 210 may retrieve a parameter table 237 for format B, which indicates that types Y, X, Z, and Q data correspond to fields 0, 1, 2, and 3, respectively, of a route advertisement generated according to format B. Translator 215 may then generate translated route advertisement 235 by matching the data entries from route advertisement 225 to the appropriate byte fields corresponding to the particular data type for which the byte fields are designated. In the example shown in FIG. 2, according to the comparison of the format A parameters and the format B parameters, the data entry (A) included in byte field 0 of route advertisement 225 should be inserted into byte field 1 of translated route advertisement 235, and the data entry (B) included in byte field 1 of route advertisement 225 should be inserted into byte field 0 of translated route advertisement 235. Once route reflector 210 has generated translated route advertisement 235, route reflector 210 provides translated route advertisement 235 to the host on network 230.

Figure 3:
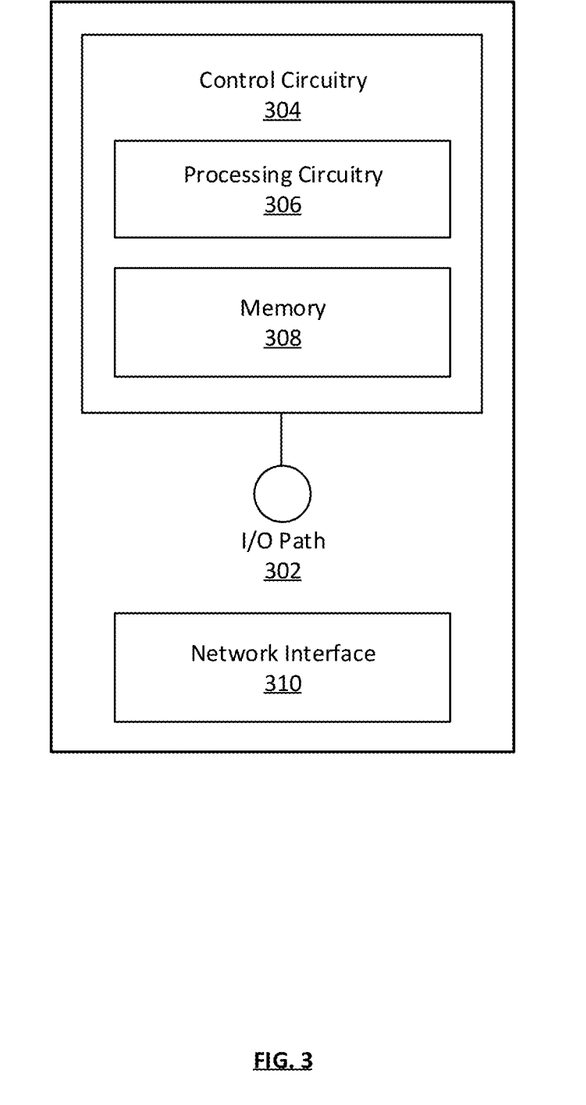
FIG. 3 shows a diagram of an illustrative route translation device of the system of FIG. 1, in accordance with some embodiments of the disclosure.

FIG. 3 shows a generalized embodiment of an illustrative route translation device 300. As depicted, route translation device 300 may be a router, server, and/or any other computing device that may be configured to receive a route advertisement, translate a route included in the route advertisement from a first address family format to a second address family format, and transmit a route advertisement including the translated route to another device via a network. The route translation device 300 may receive data via an input/output (I/O) path 302. I/O path 302 may provide the route advertisement and/or the route to control circuitry 304, which includes processing circuitry 306 and storage (or memory) 308. Control circuitry 304 may send and receive commands, requests, and other suitable data using I/O path 302. I/O path 302 may connect control circuitry 304 (and specifically processing circuitry 306) to one or more network interfaces 310, which in turn connect route translation device 300 to one or more of VPN 110 and/or EVPN 120.

Control circuitry 304 may be based on any suitable processing circuitry, such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 304 executes instructions for retrieving a route eligibility table stored in memory (i.e., storage 308), identifying, using an identifier (such as an IP and/or media access control (MAC) address) of a PE device from which the route advertisement was received as a key, one or more PE devices that are eligible to receive the route, retrieve parameters stored in memory (i.e., storage 308) for translating the route, and translate the route according to the parameters. Control circuitry 304 may further cause the translated route advertisement to be transmitted to the eligible PE devices via network interface 310.

The memory may be an electronic storage device provided as storage 308 that is part of control circuitry 304. As referred to herein, the phrase "electronic storage device" or "storage device" should be understood to mean any device for storing electronic data, computer software, instructions, and/or firmware, such as random-access memory, content-addressable memory, hard drives, optical drives, solid state devices, quantum storage devices, and/or any other suitable fixed or removable storage devices, and/or any combination of the same. Nonvolatile memory may also be used. The circuitry described herein may execute instructions included in software running on one or more general purpose or specialized processors. Multiple circuits may be provided to handle simultaneous processing functions.

Figure 4:
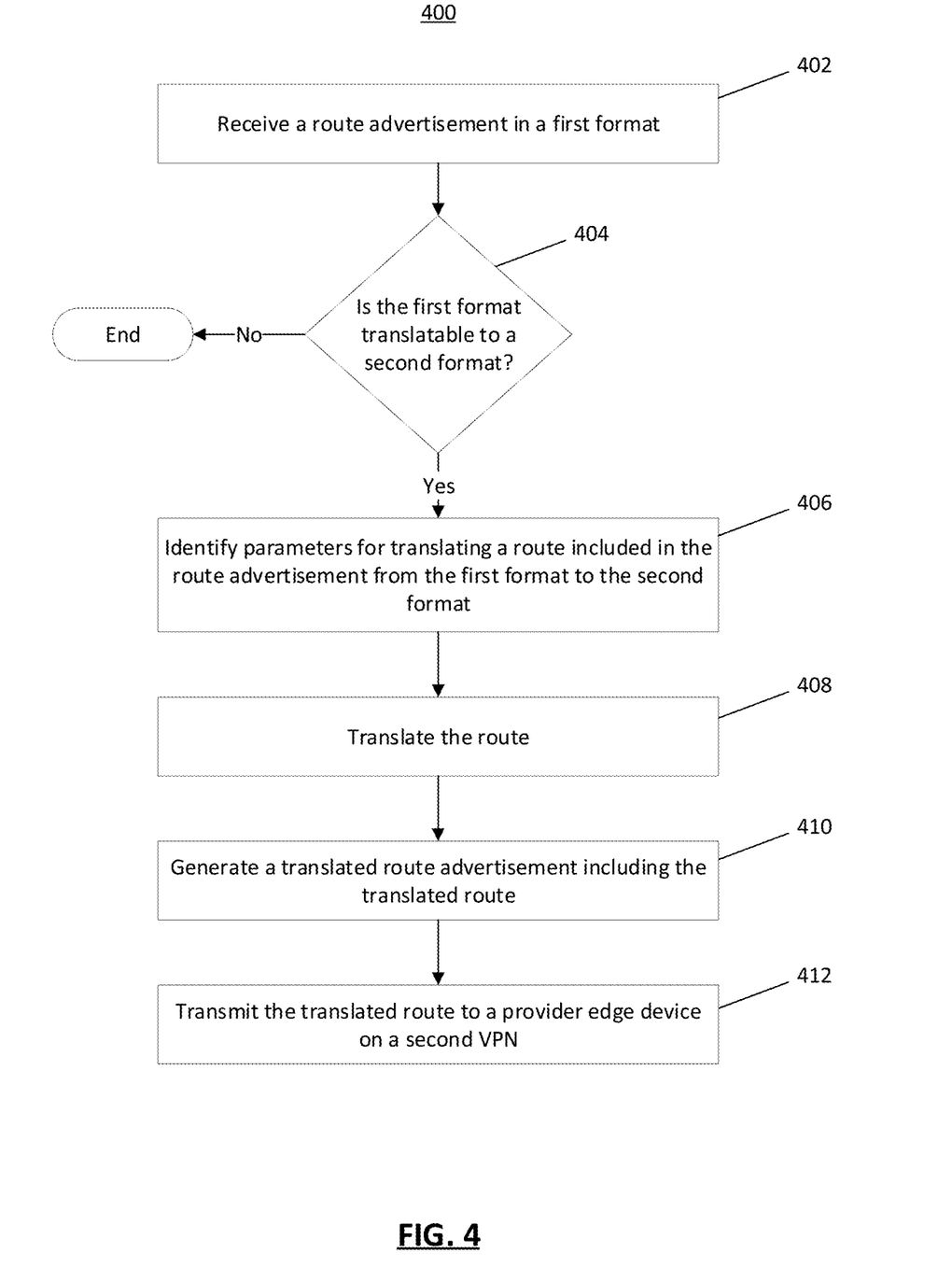
FIG. 4 is a flowchart of an illustrative process for providing route advertisements to provider edge devices on VPNs implemented using different protocols, in accordance with some embodiments of the disclosure.

FIG. 4 is a flowchart of an illustrative process for providing route advertisements to PE devices on VPNs implemented using different protocols, in accordance with some embodiments of the disclosure. A process 400 for providing route advertisements to PE devices on VPNs implemented using different protocols may begin at block 402, where control circuitry, such as control circuitry 304, receives a route advertisement including a route in a first address family format from a first PE device on a first VPN implemented using a first protocol. For example, control circuitry 304 of route reflector 111 may receive a route advertisement including a L3VPN route from PE device 112, which is part of VPN 110 that operates on the L3VPN protocol. The first address family format may correspond to a first address family standard. For example, the first address family format may be the standard according to which L3VPN routes are described or coded. In an example embodiment, the address family format corresponds to a sequence of byte fields, wherein each of the byte fields are designated to convey a particular piece of routing information, such as route target, route distinguisher, etc.

At block 404, control circuitry 304 determines whether the first address family format is translatable to a second address family format. For example, control circuitry 304 of route reflector 111 may determine whether a L3VPN route is translatable to an EVPN route. The second address family format may correspond to a second address family standard. For example, the second address family format may be the standard according to which EVPN routes are described or coded. In some embodiments, control circuitry 304 may determine whether the route advertisement includes a particular byte field (e.g., a sequence of bytes designated for a particular piece of data, such as an address, tag, etc.), and if so, determine that the first address family is translatable to the second address family based on the route advertisement including the particular byte field (and thus including the particular piece of data). In response to determining that the first address family format is translatable to the second address family format, process 400 proceeds to block 406. In response to determining that the first address family format is not translatable to the second address family format, process 400 ends.

At block 406, control circuitry 304 identifies parameters for translating the route included in the route advertisement from the first address family format into the second address family format. For example, control circuitry 304 of route reflector 111 may retrieve, from storage 308, parameters (i.e., rules, correlations, and/or other information that indicates how to translate a L3VPN route to a type 5 EVPN route) for translating the route received at block 402 from an L3VPN route to a type 5 EVPN route.

At block 408, control circuitry 304 translates the route from the first address family format into the second address family format according to the parameters identified at block 406. For example, control circuitry 304 of route reflector 111 may translate the route received at block 402 from a L3VPN route into a type 5 EVPN route. In some embodiments, control circuitry 304 may identify a route type of the route included in the route advertisement and determine the second address family format based on the route type. For example, control circuitry 304 of route reflector 111 may identify that the route included in the route advertisement received at block 402 is a L3VPN route for a node on VPN 110, and that for nodes on EVPN 120 to communicate with the node on VPN 110, the route should be translated into a type 5 EVPN route, and thereby determine that the second address family format is the type 5 EVPN format. Control circuitry 304 may further determine the second VPN protocol based on the route type and determine the second address family format based on the second VPN protocol. For example, control circuitry 304 of route reflector 111 may identify that the route included in the route advertisement received at block 402 is a L3VPN route for a node on VPN 110, and that for nodes on EVPN 120 to communicate with the node on VPN 110, the route should be translated into a type 5 EVPN route, and thereby determine that the second VPN protocol is EVPN. Control circuitry 304 may then determine that the second address family format is the type 5 EVPN format due to the second VPN protocol being EVPN. The process for translating the route from the first address family format into the second address family format is more fully described below with reference to FIG. 5.

At block 410, control circuitry 304 generates a translated route advertisement including the translated route. For example, control circuitry 304 of route reflector 111 may generate a route advertisement including the type 5 EVPN route translated at block 408.

At block 412, control circuitry 304 transmits the translated route advertisement including the translated route to a second provider edge device on a second VPN implemented using a second protocol. For example, control circuitry 304 of route reflector 111 may transmit the translated route advertisement generated at block 410, which includes the translated route generated at block 408, to PE device 122 on EVPN 120.

Figure 5:
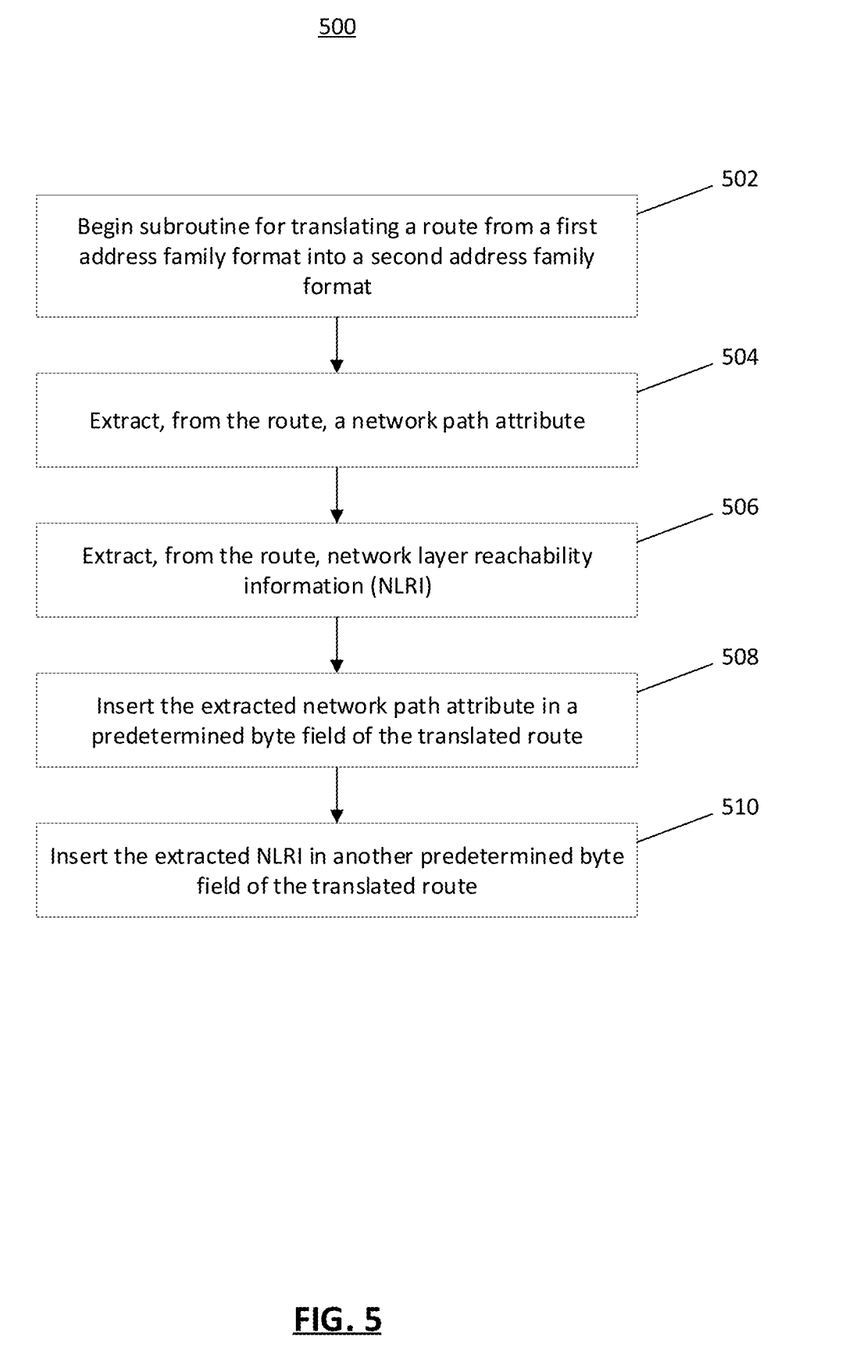
FIG. 5 is a flowchart of a detailed illustrative process for translating a route included in a route advertisement, in accordance with some embodiments of the disclosure.

FIG. 5 is a flowchart of a detailed illustrative process for translating a route from a first address family format into a second address family format, in accordance with some embodiments of the disclosure. A process 500 for translating a route from a first address family format into a second address family format may begin at block 502. At block 504, control circuitry 304 extracts a network path attribute (such as a BGP path attribute) from a route. For example, control circuitry 304 of route reflector 111 may extract, from the route received at block 402, one or more network path attributes. In some embodiments, the network path attributes comprise one or more of an autonomous system (AS) path attribute (such as one or more AS numbers), a route origin path attribute, a BGP nexthop path attribute, a route target, a virtual network identifier (VNI), a VPN label, a BGP community attribute, an extended community attribute, etc. The parameters identified at block 406 may indicate that a particular byte field of a L3VPN route includes the particular network path attribute, and control circuitry 304 may extract the data (which indicates the network path attribute) from the particular byte field of the L3VPN route.

At block 506, control circuitry 304 extracts network layer reachability information (NLRI) from the route advertisement. For example, control circuitry 304 of route reflector 111 may extract, from the route advertisement received at block 402, the NLRI. The parameters identified at block 406 may indicate that a particular byte field of a L3VPN route includes the NLRI, and control circuitry 304 may extract the data (which indicates the NLRI) from the particular byte field of the L3VPN route. The NLRI may include one or more of an IP length field, an IP prefix field, an MPLS label stack, etc., corresponding to VPN 110 and/or PE device 112.

At block 508, control circuitry 304 inserts the network path attribute into a predetermined byte field of the translated route. For example, control circuitry 304 of route reflector 111 may insert the network path attribute extracted at block 504 into the predetermined byte field of the translated route advertisement. Control circuitry 304 may first identify which byte field is the predetermined byte field based on the parameters identified at block 406. For example, the parameters identified at block 406 may indicate that a particular byte field of a type 5 EVPN route is designated for the particular network path attribute extracted at block 504. Control circuitry 304 may thus insert the network path attribute into the particular byte field of the type 5 EVPN route that is designated for the network path attribute.

At block 510, control circuitry 304 inserts the NLRI in another predetermined byte field or byte fields of the translated route advertisement. For example, control circuitry 304 of route reflector 111 may insert the NLRI extracted at block 506 into the predetermined byte fields of the translated route advertisement. Control circuitry 304 may first identify which byte field is the predetermined byte field based on the parameters identified at block 406. For example, the parameters identified at block 406 may indicate that one or more particular byte fields of a type 5 EVPN route are designated for the NLRI. Control circuitry 304 may thus insert the NLRI into the particular byte fields of the type 5 EVPN route that are designated for the NLRI.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method of providing route advertisements to provider edge devices on virtual private networks implemented using different protocols, the method comprising:
   receiving, from a first provider edge device on a first virtual private network (VPN) implemented using a first protocol, a route advertisement including a route in a first address family format, wherein the first address family format corresponds to a first address family standard;
   determining whether the first address family format is translatable to a second address family format, wherein the second address family format corresponds to a second address family standard;
   in response to determining that the first address family format is translatable to the second address family format, identifying parameters for translating the route included in the route advertisement from the first address family format into the second address family format;
   extracting, from the route advertisement, network layer reachability information (NLRI);
   generating a translated route advertisement by translating the route included in the route advertisement in accordance with the identified parameters, wherein the translated route advertisement message comprises the extracted NLRI; and
   transmitting, to a second provider edge device on a second VPN implemented using a second protocol, the translated route advertisement including the translated route.

2. The method of claim 1, wherein translating the route included in the route advertisement comprises:
   identifying a route type in the route advertisement; and
   determining the second address family format based on the route type.

3. The method of claim 2, wherein determining the second address family format comprises:
   determining the second protocol based on the route type; and
   determining the second address family format based on the second protocol.

4. The method of claim 1, wherein determining whether the first address family format is translatable to the second address family format comprises determining whether the route advertisement includes byte fields corresponding to the second address family standard.

5. The method of claim 4, wherein translating the route included in the route advertisement comprises:
   extracting, from the route advertisement, a first predetermined byte field including a border gateway protocol (BGP) path attribute; and
   generating a translated route advertisement message by inserting the extracted BGP path attribute in a second predetermined byte field of the translated route advertisement message.

6. The method of claim 1, wherein extracting, from the route advertisement, the NLRI comprises extracting, from the route advertisement, an internet protocol (IP) prefix and a multiprotocol label switching (MPLS) label.

7. A system for providing route advertisements to provider edge devices on virtual private networks implemented using different protocols, the system comprising:
   memory configured to store parameters for translating routes; and
   control circuitry configured to:
      receive, from a first provider edge device on a first virtual private network (VPN) implemented using a first protocol, a route advertisement including a route in a first address family format, wherein the first address family format corresponds to a first address family standard;
      determine whether the first address family format is translatable to a second address family format, wherein the second address family format corresponds to a second address family standard;
      in response to determining that the first address family format is translatable to the second address family format, identify, from the parameters stored in the memory, parameters for translating the route included in the route advertisement from the first address family format into the second address family format;
      extract, from the route advertisement, network layer reachability information (NLRI);

generate a translated route advertisement by translating the route included in the route advertisement in accordance with the identified parameters, wherein the translated route advertisement message comprises the extracted NLRI; and transmit, to a second provider edge device on a second VPN implemented using a second protocol, the translated route advertisement including the translated route.

8. The system of claim 7, wherein the control circuitry is configured to translate the route included in the route advertisement by:

identifying a route type in the route advertisement; and determining the second address family format based on the route type.

9. The system of claim 8, wherein the control circuitry is configured to determine the second address family format by:

determining the second protocol based on the route type; and determining the second address family format based on the second protocol.

10. The system of claim 7, wherein the control circuitry is configured to determine whether the first address family format is translatable to the second address family format by determining whether the route advertisement includes byte fields corresponding to the second address family standard.

11. The system of claim 10, wherein the control circuitry is configured to translate the route included in the route advertisement by:

extracting, from the route advertisement, a first predetermined byte field including a border gateway protocol (BGP) path attribute; and generating a translated route advertisement message by inserting the extracted BGP path attribute in a second predetermined byte field of the translated route advertisement message.

12. The system of claim 7, wherein the control circuitry is configured to extract, from the route advertisement, the NLRI by extracting, from the route advertisement, an internet protocol (IP) prefix and a multiprotocol label switching (MPLS) label.

13. A non-transitory computer-readable medium having instructions encoded thereon that, when executed by control circuitry, cause the control circuitry to:

receive, from a first provider edge device on a first virtual private network (VPN) implemented using a first protocol, a route advertisement including a route in a first address family format, wherein the first address family format corresponds to a first address family standard;

determine whether the first address family format is translatable to a second address family format, wherein the second address family format corresponds to a second address family standard;

in response to determining that the first address family format is translatable to the second address family format, identify parameters for translating the route included in the route advertisement from the first address family format into the second address family format;

extract, from the route advertisement, network layer reachability information (NLRI);

generate a translated route advertisement by translating the route included in the route advertisement in accordance with the identified parameters, wherein the translated route advertisement message comprises the extracted NLRI; and transmit, to a second provider edge device on a second VPN implemented using a second protocol, the translated route advertisement including the translated route.

14. The non-transitory computer-readable medium of claim 13, wherein the instructions further cause the control circuitry to:

identify a route type in the route advertisement; and determine the second address family format based on the route type.

15. The non-transitory computer-readable medium of claim 14, wherein the instructions further cause the control circuitry to:

determine the second protocol based on the route type; and determine the second address family format based on the second protocol.

16. The non-transitory computer-readable medium of claim 13, wherein the instructions further cause the control circuitry to: determining whether the route advertisement includes byte fields corresponding to the second address family standard.

17. The non-transitory computer-readable medium of claim 16, wherein the instructions further cause the control circuitry to:

extract, from the route advertisement, a first predetermined byte field including a border gateway protocol (BGP) path attribute; and generate a translated route advertisement message by inserting the extracted BGP path attribute in a second predetermined byte field of the translated route advertisement message.

\* \* \* \* \*